(12) United States Patent
Schley et al.

(10) Patent No.: US 11,161,228 B2
(45) Date of Patent: Nov. 2, 2021

(54) BALL JOINT PRESS

(71) Applicant: Schley Products, Inc., Anaheim Hills, CA (US)

(72) Inventors: Chad Schley, Anaheim Hills, CA (US); Tim Hume, Anaheim Hills, CA (US); Jeff Marshall, Anaheim Hills, CA (US)

(73) Assignee: SCHLEY PRODUCTS, INC., Anaheim Hills, CA (US)

( * ) Notice: Subject to any disclaimer, the term of this patent is extended or adjusted under 35 U.S.C. 154(b) by 172 days.

(21) Appl. No.: 16/433,979

(22) Filed: Jun. 6, 2019

(65) Prior Publication Data

US 2019/0375081 A1 Dec. 12, 2019

Related U.S. Application Data

(60) Provisional application No. 62/681,836, filed on Jun. 7, 2018.

(51) Int. Cl.
| | |
|---|---|
| *B25B 27/00* | (2006.01) |
| *B25B 27/02* | (2006.01) |
| *F16C 11/06* | (2006.01) |
| *B60G 7/00* | (2006.01) |

(52) U.S. Cl.
CPC ........ *B25B 27/0035* (2013.01); *B25B 27/023* (2013.01); *F16C 11/0685* (2013.01)

(58) Field of Classification Search
CPC .............. B25B 27/023; B25B 27/0035; F16C 11/0685; B60G 7/005; B60G 2206/92; B60G 2204/416
See application file for complete search history.

(56) References Cited

U.S. PATENT DOCUMENTS

| | | | |
|---|---|---|---|
| 8,499,436 B2* | 8/2013 | Shen .................. | B25B 27/062 29/724 |
| 9,085,068 B2* | 7/2015 | Schley ............... | B25B 27/0035 |
| 2012/0174388 A1* | 7/2012 | Shen .................. | B25B 27/062 29/724 |

FOREIGN PATENT DOCUMENTS

| | | | | |
|---|---|---|---|---|
| TW | 547271 | * | 12/1991 | ............ B25B 27/00 |
| TW | 547271 | | 8/2003 | |

(Continued)

OTHER PUBLICATIONS

Office Action and search report for TW108120003; dated Dec. 13, 2019.

*Primary Examiner* — Bayan Salone
(74) *Attorney, Agent, or Firm* — Stetina Brunda Garred and Brucker; Mark B. Garred (57) ABSTRACT

A ball joint press includes a first frame including a first member and a first adaptor, and a second frame including a second member and a second adaptor. A link is pivotally coupled to the first member and to the second the second member. An actuating screw is rotatably coupled to the first member and to the second member. Rotation of the actuating screw in a first rotational direction causes the first member and second member to undergo a first pivoting action relative to the link to move the first adaptor toward the second adaptor. Rotation of the actuating screw in a second rotational direction opposite the first rotational direction causes the first member and second member to undergo a second pivoting action relative to the link, opposite to the first pivot action, to move the first adaptor away from the second adaptor.

23 Claims, 9 Drawing Sheets

(56) References Cited

FOREIGN PATENT DOCUMENTS

| | | | | |
|---|---|---|---|---|
| TW | M555275 U | * | 2/2017 | ............. B25B 27/00 |
| TW | M555275 | | 2/2018 | |

* cited by examiner

BALL JOINT PRESS

CROSS-REFERENCE TO RELATED APPLICATIONS

This application claims the benefit of U.S. Application Ser. No. 62/681,836, filed Jun. 7, 2018, the contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to a press for removing a ball joint, and more specifically to a press having an actuating screw operatively coupled to a pair of frame members capable of applying a force on the ball joint to dislodge the ball joint.

2. Description of the Related Art

A ball joint is a critical component incorporated into many suspension and steering systems in vehicles which connects the vehicle's tire and wheel to the suspension. More specifically, a ball joint may connect the control arm to a steering knuckle and may pivot between a wheel and the corresponding suspension system. The front of most vehicles typically includes upper and lower ball joints on both the driver's side and the passenger's side.

Over time, one or more ball joints may experience wear, which may compromise the effectiveness of the ball joint. Along these lines, the lower ball joints are typically bigger than the upper ball joints and may wear out faster due to the front weight of the vehicle at least partially resting on the lower ball joints. Thus, routine maintenance of a vehicle may include checking the ball joints for wear and replacing the ball joints when excessive wear is detected.

When excessive wear is detected and replacement of the ball joint is determined as the appropriate remedy, removal of the ball joint generally entails applying a force to the ball joint to dislodge the ball joint from engagement with the joint knuckle. There may be difficulties associated with removal of a worn ball joint due to the location of the ball joint as being incorporated into a generally complex mechanical system, as well as the typically strong engagement between the ball joint and the joint knuckle within which the ball joint is seated.

Accordingly, there is a need in the art for a device configured to simplify removal of a ball joint from a vehicle. Various aspects of the present disclosure address this particular need, as will be discussed in more detail below.

BRIEF SUMMARY

In accordance with one embodiment of the present disclosure, there is provided a press for removing a ball joint from a vehicle. The press includes a first frame including a first member and a first adaptor. The first member includes a first press portion and a first actuating portion, with the first adaptor being coupled to the first press portion. The press additionally includes a second frame including a second member and a second adaptor. The second member includes a second press portion and a second actuating portion, with the second adaptor being coupled to the second press portion. A link is pivotally coupled to the first member between the first press portion and the first actuating portion and to the second the second member between the second press portion and the second actuating portion. An actuating screw is rotatably coupled to the first actuating portion of the first member and the second actuating portion of the second member. Rotation of the actuating screw in a first rotational direction causes the first member and second member to undergo a first pivoting action relative to the link to move the first adaptor toward the second adaptor. Rotation of the actuating screw in a second rotational direction opposite the first rotational direction causes the first member and second member to undergo a second pivoting action relative to the link, opposite to the first pivot action, to move the first adaptor away from the second adaptor.

The first frame may further include a first rocker pivotally coupled to the first frame, with the first adaptor being detachably coupled to the first rocker. The second frame may further include a second rocker pivotally coupled to the second frame, with the second adaptor being detachably coupled to the second rocker.

The first member may be configured to translate along the actuating screw in response to rotation of the actuating screw relative to the first member. The first frame may include a nut coupled to the first member, with the nut having an internally threaded aperture extending therethrough and engageable with external threads formed on the actuating screw. The nut may be pivotally coupled to the first frame.

The second frame may include a rocking washer pivotally coupled to the second member. The rocking washer may include a bore, with an end of the actuating screw being captured within the bore. The bore may extend only partially through the rocking washer and define a recessed face. The press may additionally include a rolling ball coupled to the actuating screw. The rolling ball may contact the recessed face when the end of the actuating screw is captured within the bore.

The first adaptor may include a cylindrical collar extending around an axis and defining a distal edge. The cylindrical collar may include a recessed edge spaced from the distal edge.

According to another embodiment, there is provided a press for removing a ball joint from a joint seat on a vehicle. The press includes an actuating screw having a threaded shaft and a non-threaded end portion. A first frame is threadingly coupled to the threaded shaft. The first frame includes a first member and a first adaptor pivotally coupled to the first member. A second frame is coupled to the non-threaded end portion. The second frame includes a second member and a second adaptor pivotally coupled to the second member. The press further includes a link having opposed end portions pivotally coupled to respective ones of the first and second frame members. Rotation of the actuating screw in a first direction causes the first and second adaptors to move toward each other for engaging with the ball joint and applying a force on the ball joint for removing the ball joint from the joint seat. Rotation of the actuating screw in a second direction opposite the first direction causes the first and second adaptors to move away from each other.

The actuating screw may extend along a longitudinal axis, and the first member may be moveable along the longitudinal axis in response to rotation of the actuating screw. The second frame may be configured to remain axially stationary relative to the longitudinal axis when the actuating screw is rotated.

The first frame may include a nut coupled to the first member, with the nut having an internally threaded aperture extending therethrough and engageable with the threaded shaft on the actuating screw.

According to another embodiment, there is provided a method of removing a ball joint from a vehicle frame. The method includes the steps of positioning a press adjacent the ball joint and rotating an actuating screw on the press in a first rotational direction causing a first member and a second member to undergo a first pivoting action relative to a link to move a first adaptor toward a second adaptor until the first and second adaptors engage the ball joint and urge the ball joint out of engagement with the frame.

The method may include the step of rotating the actuating screw in a second rotational direction causing the first member and second member to undergo a second pivoting action relative to the link to move the first adaptor away from the second adaptor.

The method may further include the step of attaching the first adaptor to a first rocker and the second adaptor to a second rocker.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

Referring now to the drawings, wherein the showings are for purposes of illustrating a preferred embodiment of the present disclosure, and are not for purposes of limiting the same, there is depicted a press 10 specifically configured and adapted for easily removing a ball joint 12 from a joint seat 14 on a vehicle. The press 10 generally includes a pivoting frame assembly and an actuating screw 16. The pivoting action of the frame assembly allows the press 10 to be positioned in a manner which allows for easy access to the ball joint 12. Furthermore, the actuating screw 16 is connected to the frame in a manner which provides for mechanical advantage, e.g., leverage, for more easily generating sufficient force to unseat the ball joint 12.

Figure 1:
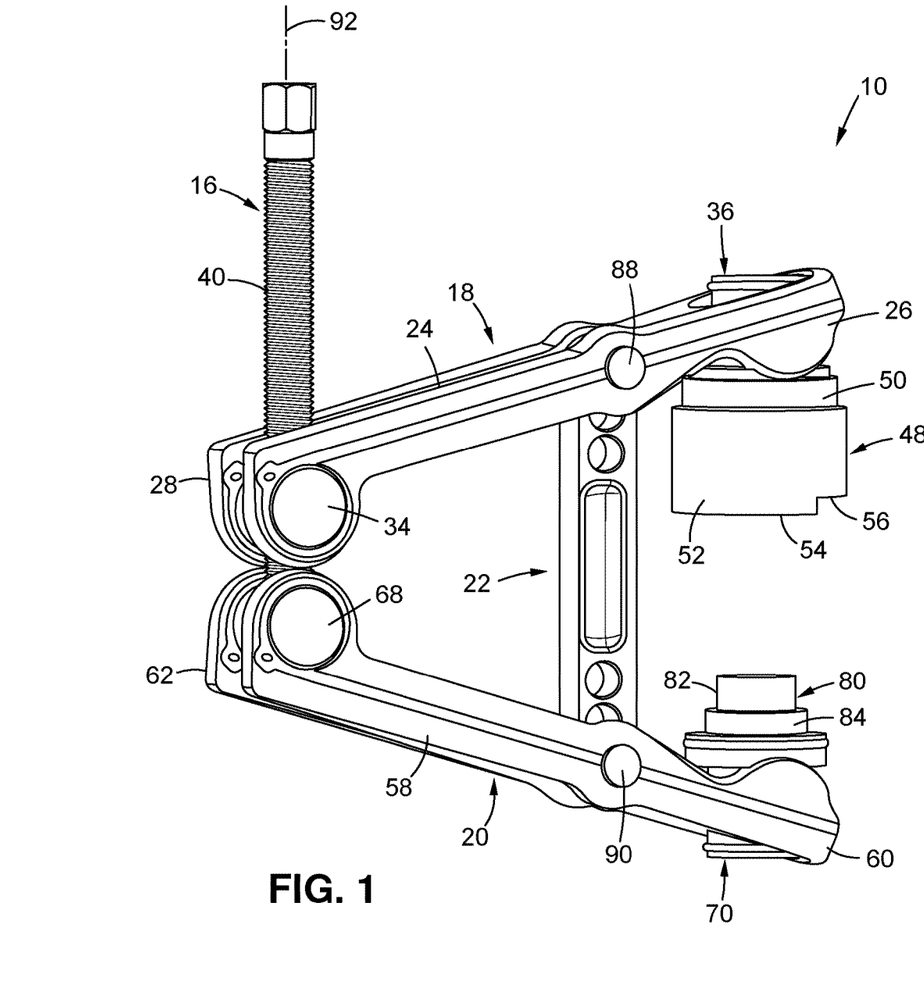
FIG. 1 is a perspective view of a press for removing a ball joint.

FIG. 1 shows the press 10 by itself, while FIGS. 2-8 show the press 10 in use for removing the ball joint 12 from the joint seat 14. According to one embodiment, the press 10 generally includes a first frame 18, a second frame 20, a link 22, and the actuating screw 16. The first frame 18 includes a first member 24 comprised of an elongate body having a first press portion 26 and a first actuating portion 28. The elongate body may include a pair of sidewalls separated by a central channel. The pair of sidewalls may be connected by a rounded end wall at the first press portion 26. The first frame 18 may include an actuator end aperture 30 and a first pivot aperture 32 formed therein, the purposes of which will be described in more detail below.

The first frame 18 may include a jack nut 34 at the first actuating portion 28 and a first rocker 36 at the first press portion 26. The jack nut 34 may include a generally cylindrical body having a threaded aperture 38 extending completely therethrough. The jack nut 34 may be configured to be received within the actuator end aperture 30 and extend between the pair of sidewalls of the first member 24. The threaded aperture 38 may be configured to engage with a threaded shaft 40 on the actuating screw 16, as will be described in more detail below. The outer surface of the jack nut 34 adjacent the opposed ends of the aperture 38 may be tapered to provide clearance for the actuating screw 16 as the first member 24 translates along the actuating screw 16, as will be described in more detail below. The jack nut 34 may be pivotally coupled to the first member 24 to accommodate the pivoting motion of the first member relative to the actuating screw 16 as the first member 24 moves along the actuating screw 16.

The first rocker 36 may be pivotally coupled to the rounded end wall of the first member 24 and reside within an internal space defined by the rounded end wall. The first rocker 36 may include a shaft 42 which may be coupled to the rounded end wall, and a distal flange 44 extending around the shaft 42, and positioned so as to be exposed, i.e., not covered by the rounded end wall. The distal flange 44 may include a circumferential groove sized to receive an o-ring 46.

The first frame 18 may further include a first adaptor 48 detachably engageable with the first rocker 36. In this regard, the first adaptor 48 may include a cylindrical wall 50 sized to be frictionally engageable with the o-ring 46 on the first rocker 36 to frictionally engage the first rocker 36. The first adaptor 48 may be designed to engage with the joint seat 14 and provide a cavity which the ball joint 12 may be pressed into when unseating the ball joint 12. The first adaptor 48 may include a cylindrical collar 52 extending around an axis and defining a distal edge 54. The cylindrical collar 52 may include a recessed edge 56 spaced from the distal edge 54 in a direction parallel to the axis. The recessed edge 56 may provide space to allow an end portion of the ball joint 12 to pass therethrough when aligning the first rocker 36 with the ball joint 12. It is contemplated several first adaptors 48 that have cylindrical collars 52 that vary in size may be interchangeably used with the first rocker 36. In this regard, selection of the first adaptor 48 having a properly sized cylindrical collar 52 will depend on the size of the ball joint 12. Larger ball joints 12 may require a larger cylindrical collar 52, while smaller ball joints 12 may require smaller cylindrical collars 52.

The second frame 20 may be similar to the first frame 18 and include a second member 58 comprised of an elongate body having a second press portion 60 and a second actuating portion 62. The elongate body may include a pair of sidewalls separated by a central channel. The pair of sidewalls may be connected by a rounded end wall at the second press portion 60. The second frame 20 may include an actuator end aperture 64 and a second pivot aperture 66 formed therein.

The second frame 20 may include a rocking washer 68 at the second actuating portion 62 and a second rocker 70 at the second press portion 60. The rocking washer 68 may include a generally cylindrical body having a bore extending therein. The bore may extend only partially through the rocking washer 68 and define a recessed face 72. The rocking washer 68 may be configured to be received within the actuator end aperture 64 and extend between the pair of sidewalls. The bore may be configured to receive a non-threaded end portion 74 of the actuating screw 16, as will be described in more detail below.

The second rocker 70 may be pivotally coupled to the rounded end wall of the second member 58 and reside within an internal space defined by the rounded end wall. The second rocker 70 may be identical in shape to the first rocker 36, with the primary distinction being the adaptor that is engaged with the rocker. In this regard, the second rocker 70 includes a shaft 76 which may be coupled to the rounded end wall, and a distal flange 78 extending around the shaft 76, and positioned so as to be exposed, i.e., not covered by the rounded end wall. The distal flange 78 may include a central wall 79 defining a central opening extending into the distal flange. Referring to FIG. 2B, the central wall 79 may include groove 81 formed therein and adapted to receive an internal o-ring for facilitating engagement with a second adaptor 80. The second rocker 70 may also include a groove formed in an outer circumference for receiving an outer o-ring, similar to the first rocker 36. In this regard, the first and second rockers 36, 80, and the corresponding first and second members 24, 58 may be universal, with both rockers 36, 80 being configured to engage with either one of the first and second adaptors 48, 80.

The second frame 20 may further include a second adaptor 80 detachably engageable with the second rocker 70. In this regard, the second adaptor 80 may include a pressing portion 82 and an attaching portion 84. The attaching portion 84 may be sized to be received in the frictionally engageable with the o-ring on the second rocker 70 to frictionally engage the second rocker 70. The pressing portion 82 may be designed to engage with an end of the ball joint 12 and apply a force thereto for unseating the ball joint 12. It is contemplated several second adaptors 80 that have pressing portions 82 that vary in size may be interchangeably used with the second rocker 70. In this regard, selection of the second adaptor 80 having a properly sized pressing portion 82 will depend on the size of the ball joint 12. Larger ball joints 12 may require a larger pressing portion 82, while smaller ball joints 12 may require smaller pressing portions 82.

The link 22 is pivotally coupled to the first member 24 between the first press portion 26 and the first actuating portion 28 and to the second member 58 between the second press portion 60 and the second actuating portion 62. The link 22 includes an elongate body having a plurality of apertures 86, 88 formed therein. In the exemplary embodiment, the link 22 includes three apertures 86 formed adjacent a first end portion of the link 22, and three additional apertures 88 formed adjacent a second end portion of the link 22. The apertures 86, 88 are provided to facilitate connection of the link 22 to the first and second members 24, 58. In particular, one of the apertures 86 on the link 22 may be aligned with the first pivot aperture 32 of the first member 24 and another one of the apertures 88 on the link 22 may be aligned with the second pivot aperture 66 of the second member 58. A first pivot clevis 88 may be advanced through the aligned link aperture 86 and first pivot aperture 32, while a second pivot clevis 90 may be advanced through the aligned link aperture 88 and the second pivot aperture 66.

An actuating screw 16 is rotatably coupled to the first actuating portion 28 of the first member 24 and the second actuating portion 62 of the second member 58. The actuating screw 16 may include the threaded shaft 40 and the non-threaded end portion 74. The actuating screw 16 may extend along a longitudinal axis 92. In one embodiment, the first member 24 may be moveable along the longitudinal axis 92 in response to rotation of the actuating screw 16, while the second frame 20 may be configured to remain axially stationary relative to the longitudinal axis 92 when the actuating screw 16 is rotated. A rolling ball 94 or ball bearing may be coupled to the actuating screw 16. In this regard, the non-threaded end portion 74 of the actuating screw 16 may include a recess 96 which receives the rolling ball 94. The rolling ball 94 may contact the recessed face 72 of the rocking washer 68 when the end of the actuating screw 16 is captured within the bore. The rolling ball 94 may allow the actuating screw 16 to rotate relative to the second frame 20, without causing the second frame 20 to move along the actuating screw 16.

Rotation of the actuating screw 16 in a first rotational direction causes the first member 24 and second member 58 to undergo a first pivoting action relative to the link 22 to move the first adaptor 48 toward the second adaptor 80 for engaging with the ball joint 12 and applying a force on the ball joint 12 for removing the ball joint 12 from the joint seat 14. Rotation of the actuating screw 16 in a second rotational direction opposite the first rotational direction may cause the first member 24 and second member 58 to undergo a second pivoting action relative to the link 22, opposite to the first pivot action, to move the first adaptor 48 away from the second adaptor 80.

Figure 2:
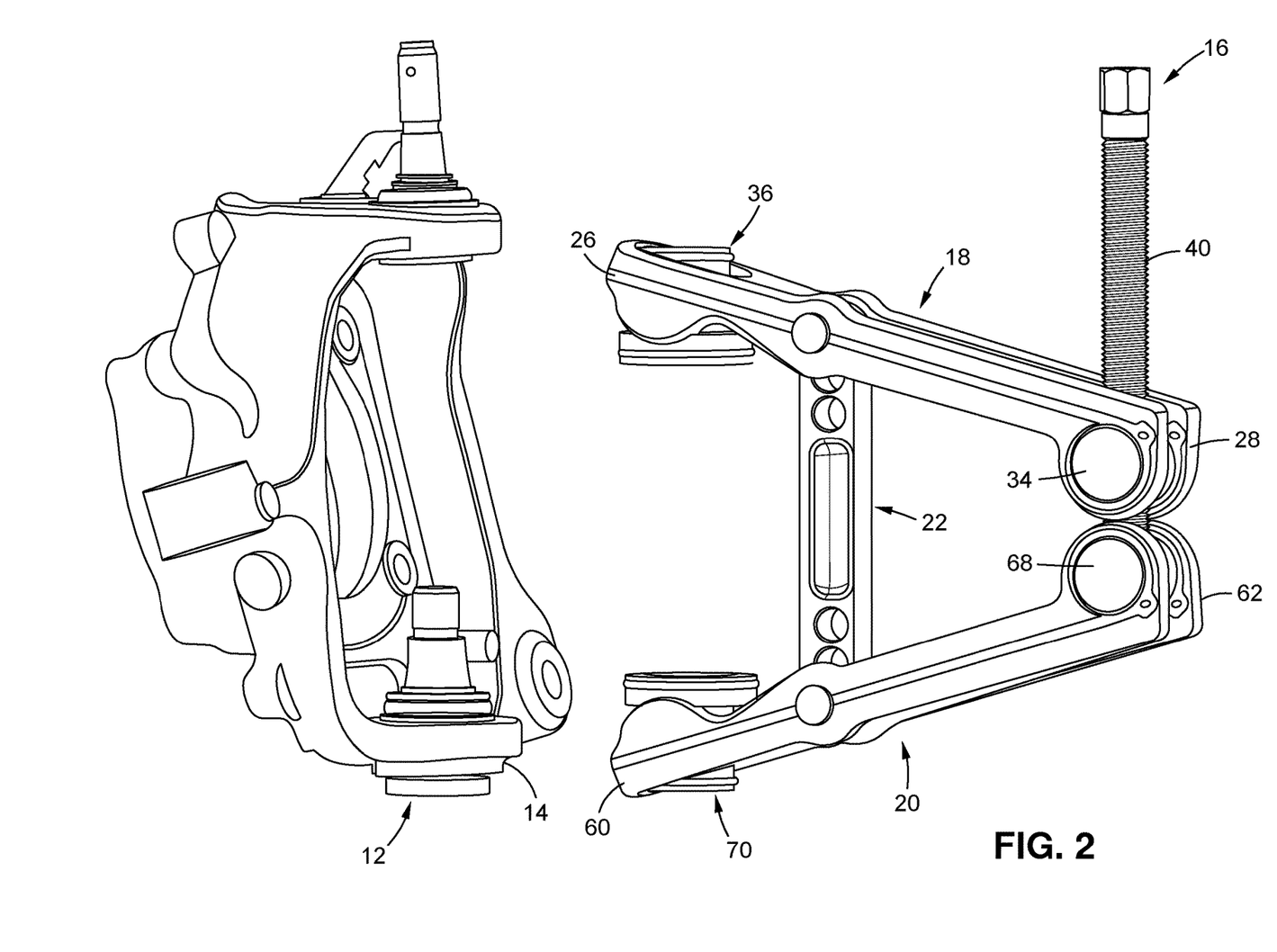
FIG. 2 is a perspective view of a ball joint in a joint seat, and the press shown without adaptors.
Figure 2A:
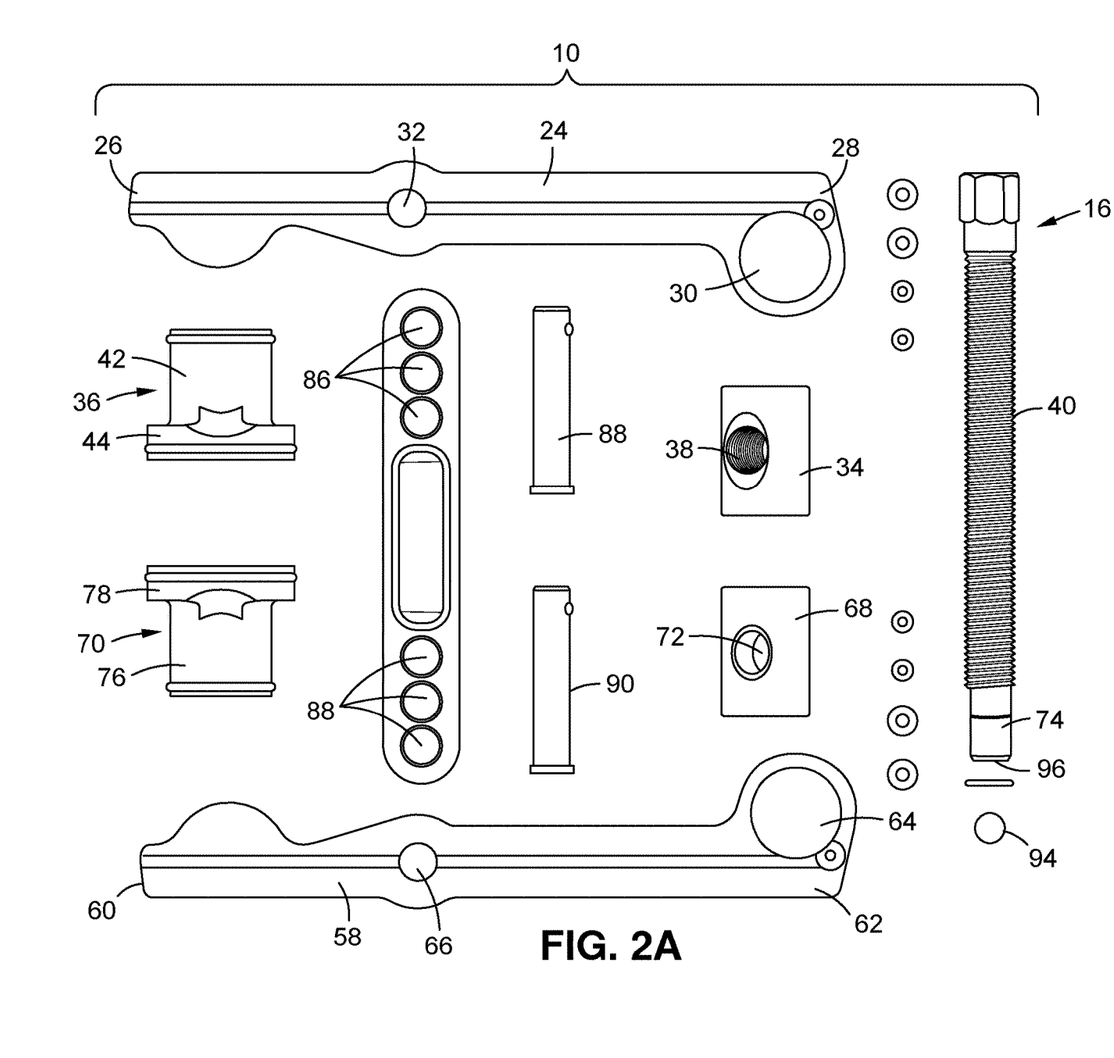
FIG. 2A is a plan view of the components of the press shown in FIG. 2.
Figure 2B:
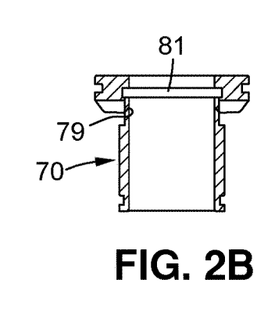
FIG. 2B is a cross sectional view of a rocker.

FIGS. 2-8 depict a sequence of using the press 10 to remove a ball joint 12 from a joint seat 14. As shown in FIG. 2, the press 10 is not yet fitted with first and second adaptors 48, 80. Furthermore, the ball joint 12 is shown as being attached to a steering knuckle having a joint seat 14. The press 10 is also shown in an open position, with the first and second actuating portions 28, 62 being positioned adjacent each other, such that there is a minimal amount of the threaded shaft 40 extending therebetween. When the press 10 is in the open position, the first and second rockers 36, 70 may be spaced apart by a maximum distance to facilitate engagement with the first and second adaptors 48, 80, respectively.

Figure 3:
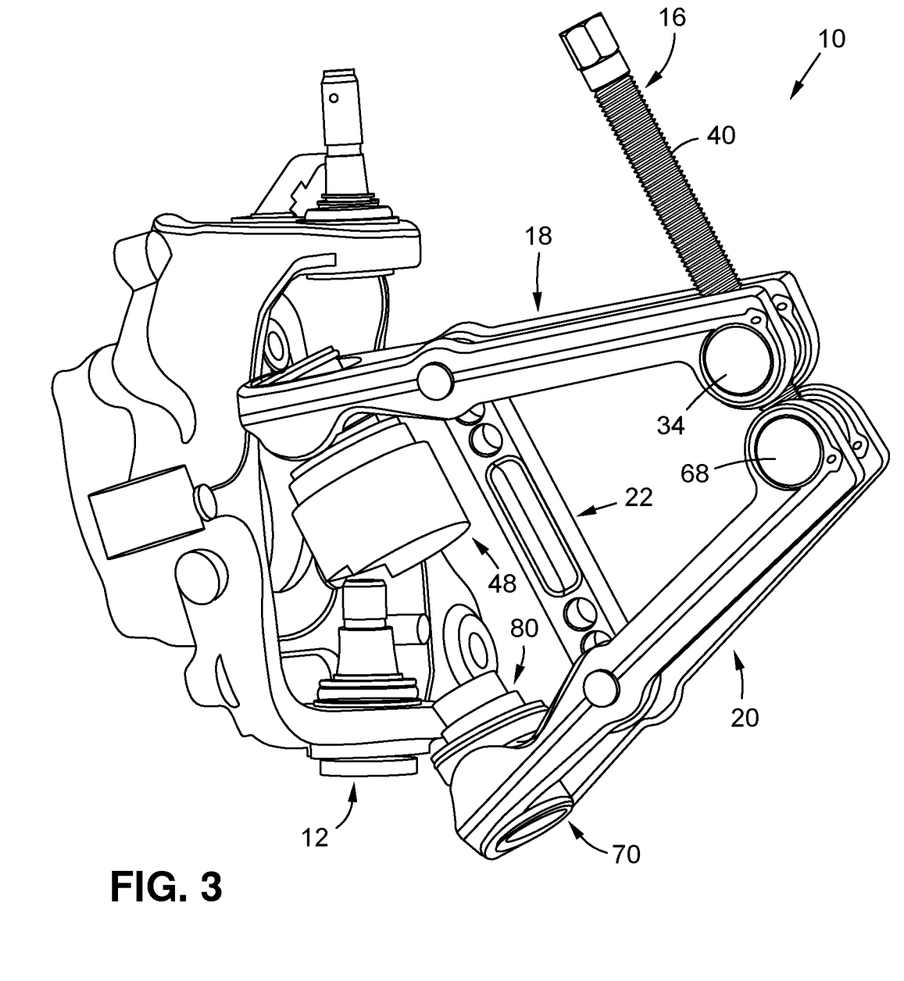
FIG. 3 is a perspective view of the press positioned adjacent the ball joint, with a first adaptor being moved over a first end portion of the ball joint.

FIG. 3 shows the press 10 with the first and second adaptors 48, 80 coupled to the first and second rockers 36, 70, respectively, with the first adaptor 48 being moved over an end portion of the ball joint 12. The recessed edge on the first adaptor 48 may provide sufficient clearance between the first adaptor 48 while the first adaptor 48 is being moved over the ball joint 12. Once the first adaptor 48 is placed over one end of the ball joint 12, the second adaptor 80 may be moved over the other end of the ball joint 12. During this positioning of the first and second adaptors 48, 80 over the respective ends of the ball joint 12, the press 10 may remain in the open position to provide maximum clearance.

Figure 4:
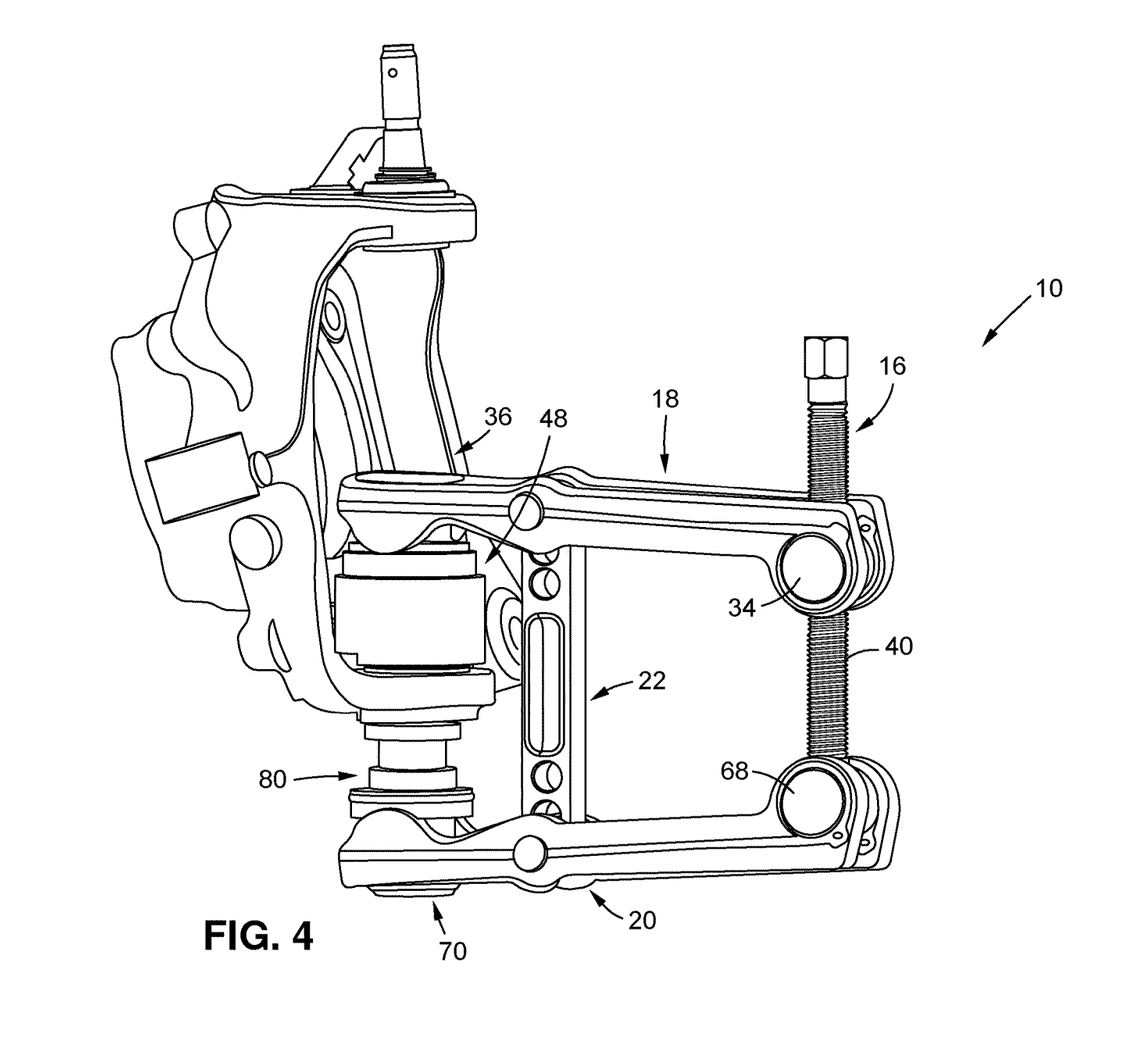
FIG. 4 is a perspective view of the press with the first adaptor positioned over the first end portion of the ball joint and a second adaptor positioned under a second end portion of the ball joint.

When the first and second adaptors 48, 80 are aligned with the ball joint 12, e.g., the longitudinal axis defined by the ball joint 12 is substantially co-axially aligned with the axes about which both the first and second adaptors 48, 80 are disposed, the press 10 is moved from the open position toward a closed position. To effectuate such movement, the actuating screw 16 is rotated in a first direction, which causes the first actuating portion 28 of the first member 24 to translate along the actuating screw 16 away from the second member 58. This motion causes the first member 24 to pivot relative to the link 22 about the first pivot clevis, which in turn, moves the first pressing portion and the first adaptor 48 toward the second pressing portion 60 and the second adaptor 80. Rotation of the actuating screw 16 results in the ball joint 12 of the actuating screw 16 spinning within the bore of the rocking washer 68. The first adaptor 48 is eventually brought into contact with the joint knuckle, while the second adaptor 80 is brought into contact with the ball joint 12, as shown in FIG. 4. In this respect, from the perspective shown in FIG. 4, the first adaptor 48 may press down on the joint knuckle, while the second adaptor 80 may press up on the ball joint 12. These opposing forces urge the ball joint 12 out of its joint seat 14.

Figure 5:
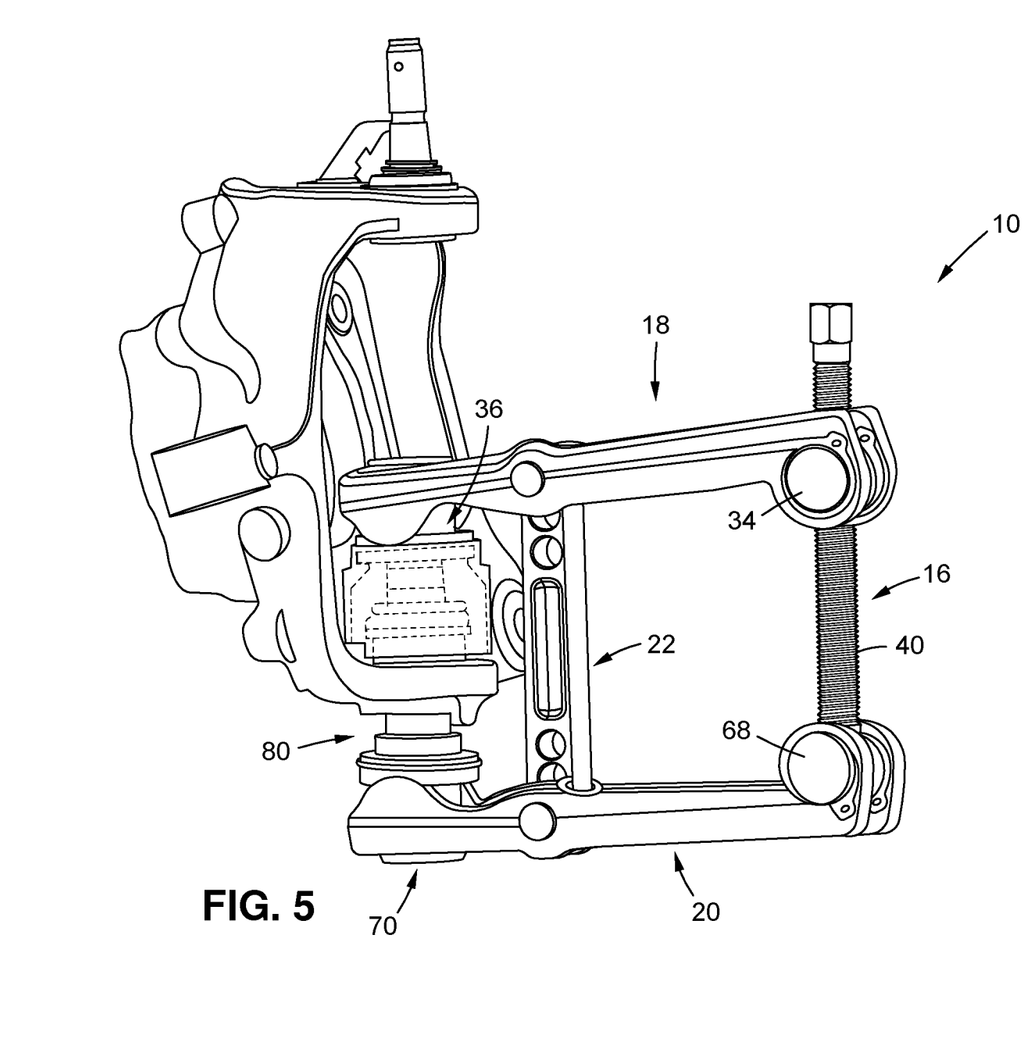
FIG. 5 is a perspective view showing the press engaged with the ball joint, with the first adaptor depicted in phantom to illustrate an initial unseating of the ball joint from the joint seat.
Figure 6:
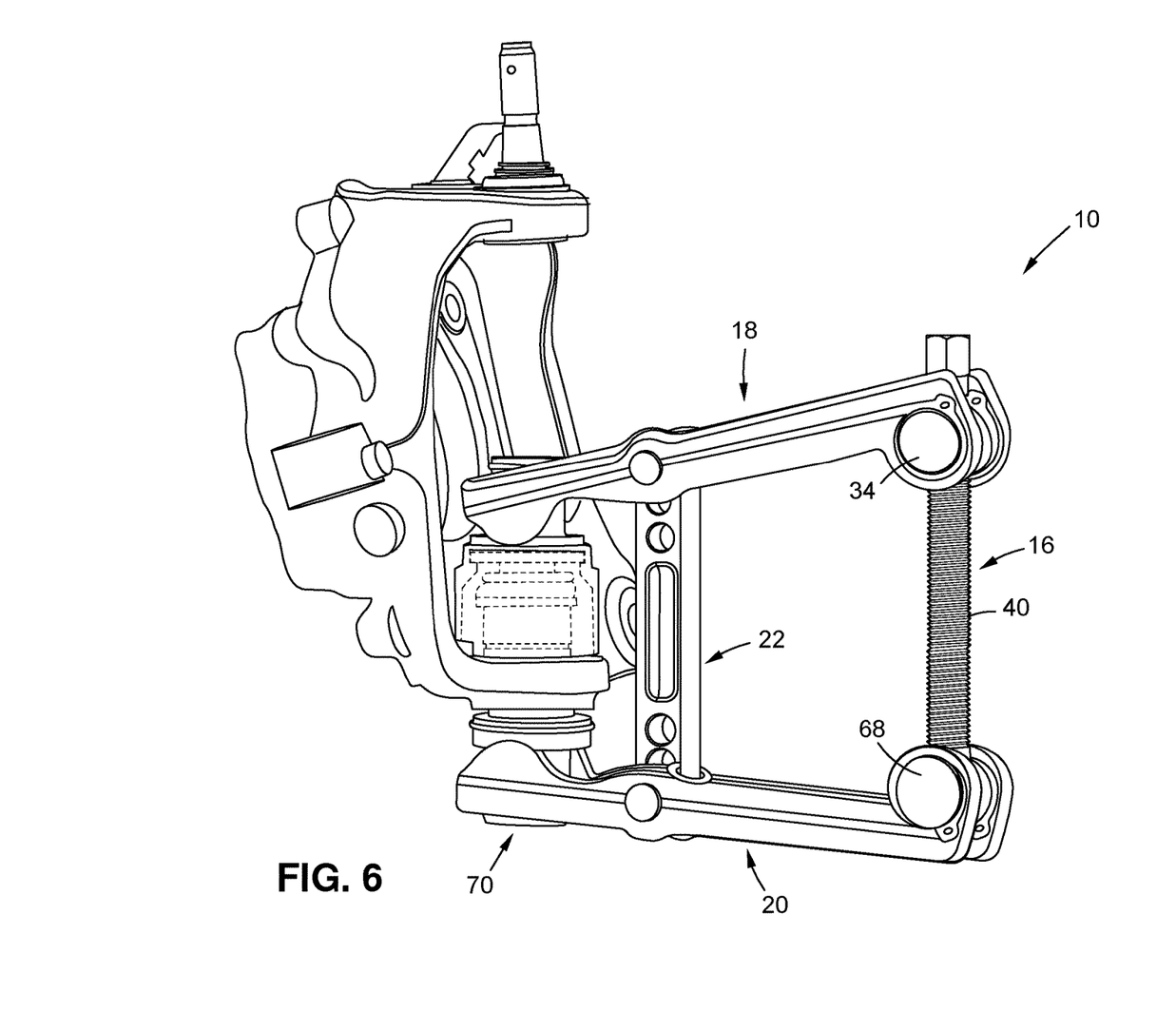
FIG. 6 is a perspective view showing the press engaged with the ball joint, with the first adaptor depicted in phantom to illustrate continued unseating of the ball joint from the joint seat.

FIG. 5 shows the first and second actuating portions 28, 62 separated further than the configuration shown in FIG. 4, while the first and second adaptors 48, 80 are moved closer together and the ball joint 12 has become unseated from the joint knuckle. FIG. 6 shows a continuation of the joint being removed from the seat, with a greater portion of the ball joint 12 being received in the first adaptor 48. Furthermore, FIG. 6 depicts the press 10 in a fully closed position, with the first actuating portion 28 reach an end of the threaded shaft 40, thereby creating a maximum space between the first and second actuating portions 28, 62.

Figure 7:
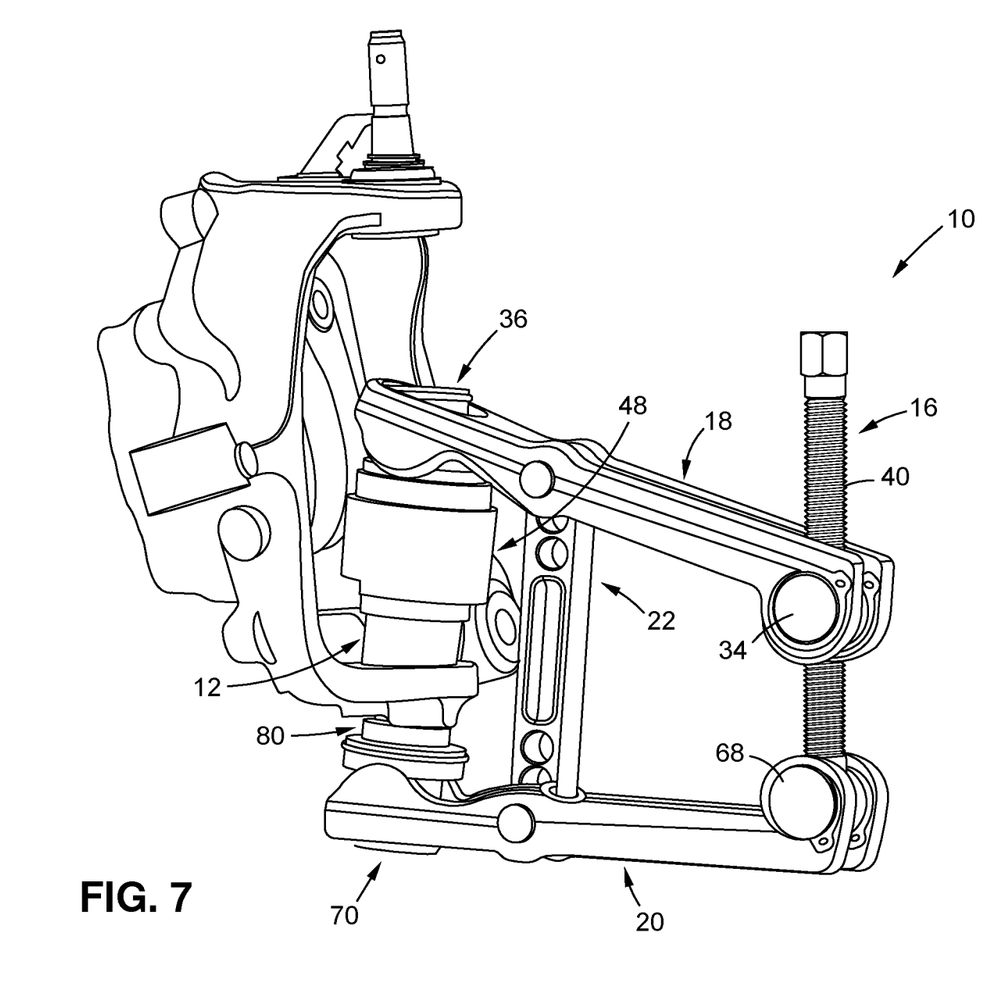
FIG. 7 is a perspective view of the press being removed from the unseated ball joint.

FIG. 7 shows the press 10 returning from the fully closed position toward the open position to remove the press 10 and ball joint 12 from the joint knuckle. The press 10 is returned to the open position by rotating the actuating screw 16 in the second rotational direction, moves the first actuating portion 28 along the threaded shaft 40 toward the second actuating portion 62.

Figure 8:
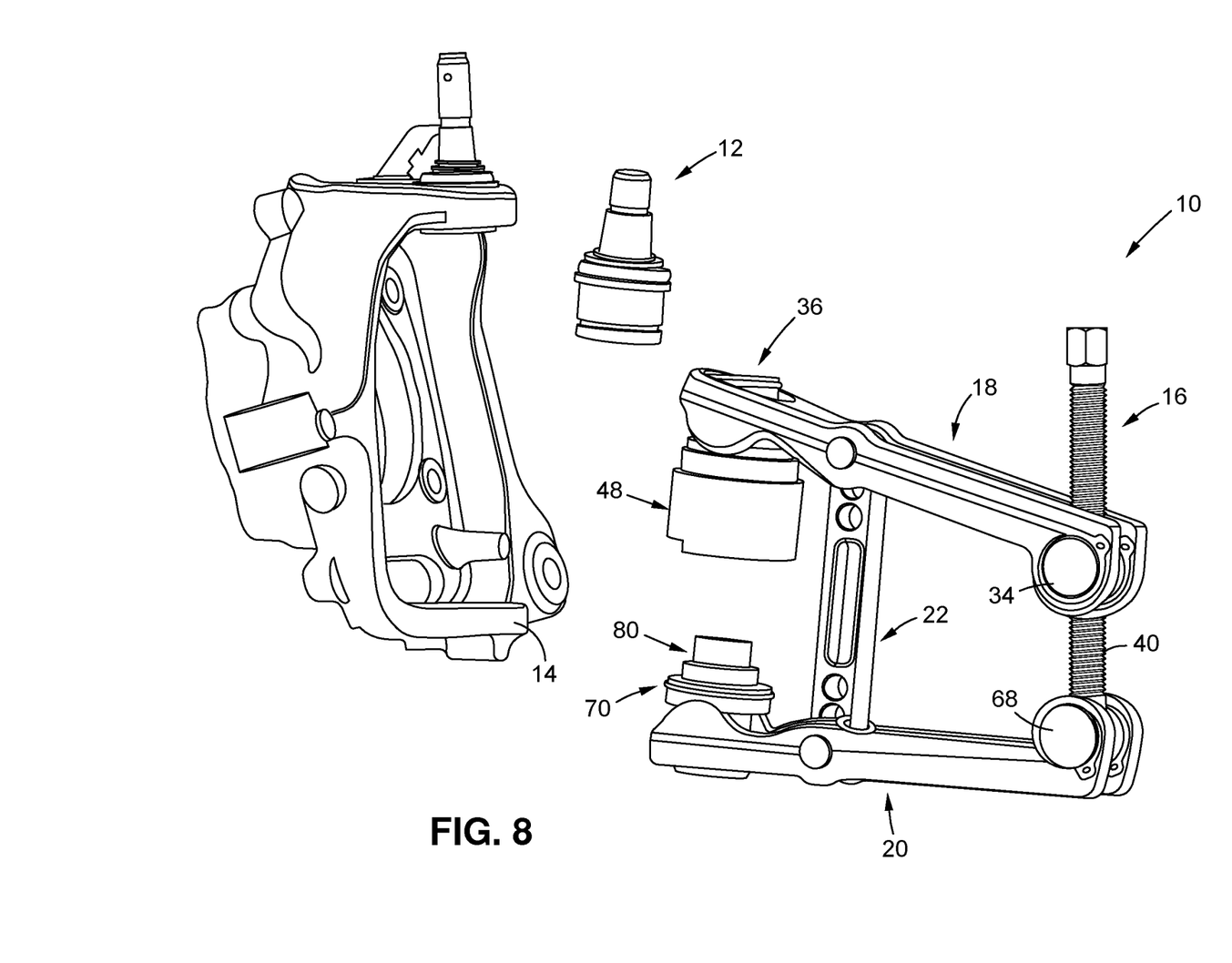
FIG. 8 is a perspective view of the ball joint removed from the joint seat, and the press disengaged from the ball joint.

FIG. 8 shows the ball joint 12 removed from the vehicle 12 and the press 10.

The particulars shown herein are by way of example only for purposes of illustrative discussion and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A press for removing a ball joint from a vehicle, the press comprising:
    a first frame including a first member, a first rocker, and a first adaptor, the first member having a first press portion and a first actuating portion, the first rocker being pivotally coupled to the first press portion of the first member, with the first adaptor being detachably coupled to the first rocker;
    a second frame having a second member and a second adaptor, the second member having a second press portion and a second actuating portion, the second adaptor coupled to the second press portion;
    a link pivotally coupled to the first member between the first press portion and the first actuating portion and to the second the second member between the second press portion and the second actuating portion; and
    an actuating screw being rotatably coupled to the first actuating portion of the first member and the second actuating portion of the second member;
    rotation of the actuating screw in a first rotational direction causing the first member and second member to undergo a first pivoting action relative to the link to move the first adaptor toward the second adaptor;
    rotation of the actuating screw in a second rotational direction opposite the first rotational direction causing the first member and second member to undergo a second pivoting action relative to the link opposite to the first pivot action to move the first adaptor away from the second adaptor.

2. The press recited in claim 1, wherein the second frame further comprises a second rocker pivotally coupled to the second frame, the second adaptor being detachably coupled to the second rocker.

3. The press recited in claim 1, wherein the first member is configured to translate along the actuating screw in response to rotation of the actuating screw relative to the first member.

4. The press recited in claim 3, wherein the first frame comprises a nut coupled to the first member, the nut having an internally threaded aperture extending therethrough and engageable with external threads formed on the actuating screw.

5. The press recited in claim 4, wherein the nut is pivotally coupled to the first member.

6. The press recited in claim 1, wherein the second frame includes a rocking washer pivotally coupled to the second member, the rocking washer including a bore, an end of the actuating screw being captured within the bore.

7. The press recited in claim 6, wherein the bore extends only partially through the rocking washer and defines a recessed face.

8. The press recited in claim 7, further comprising a rolling ball coupled to the actuating screw, the rolling ball contacting the recessed face when the end of the actuating screw is captured within the bore.

9. The press recited in claim 1, wherein the first adaptor comprises a cylindrical collar extending around an axis and defining a distal edge, the cylindrical collar including a recessed edge spaced from the distal edge.

10. A press for removing a ball joint from a joint seat on a vehicle, the press comprising:
    an actuating screw having a threaded shaft and a non-threaded end portion;
    a first frame threadingly coupled to the threaded shaft, the first frame including a first member and a first adaptor pivotally coupled to the first member;
    a second frame coupled to the non-threaded end portion, the second frame including a second member and a second adaptor pivotally coupled to the second member;
    a link having opposed end portions pivotally coupled to respective ones of the first and second frame members;

rotation of the actuating screw in a first direction causing the first and second adaptors to move toward each other for engaging with the ball joint and applying a force on the ball joint for removing the ball joint from the joint seat;

rotation of the actuating screw in a second direction opposite the first direction causing the first and second adaptors to move away from each other.

11. The press recited in claim 10, wherein the actuating screw extends along a longitudinal axis, the first member being moveable along the longitudinal axis in response to rotation of the actuating screw.

12. The press recited in claim 11, wherein the second frame is configured to remain axially stationary relative to the longitudinal axis when the actuating screw is rotated.

13. The press recited in claim 10, wherein the first adaptor comprises a cylindrical collar extending around an adaptor axis and defining a distal edge, the cylindrical collar including a recessed edge spaced from the distal edge.

14. The press recited in claim 10, wherein the first frame further comprises a first rocker pivotally coupled to the first frame, the first adaptor being detachably coupled to the first rocker.

15. The press recited in claim 14, wherein the second frame further comprises a second rocker pivotally coupled to the second frame, the second adaptor being detachably coupled to the second rocker.

16. The press recited in claim 10, wherein the first frame comprises a nut coupled to the first member, the nut having an internally threaded aperture extending therethrough and engageable with the threaded shaft on the actuating screw.

17. A method of removing a ball joint from a vehicle frame, the method comprising the steps of:

positioning a press adjacent the ball joint, the press comprising:

a first frame including a first member, a first rocker, and a first adaptor, the first member having a first press portion and a first actuating portion, the first rocker being pivotally coupled to the first press portion of the first member, with the first adaptor being detachably coupled to the first rocker;

a second frame having a second member, a second rocker, and a second adaptor, the second member having a second press portion and a second actuating portion, the second rocker being pivotally coupled to the second press portion of the second member, with the second adaptor being detachably coupled to the second rocker;

a link pivotally coupled to the first member between the first press portion and the first portion end and to the second the second member between the second press portion and the second actuating portion; and an actuating screw being rotatably coupled to the first actuating portion of the first member and the second actuating portion of the second member;

rotating the actuating screw in a first rotational direction causing the first member and second member to undergo a first pivoting action relative to the link to move the first adaptor toward the second adaptor until the first and second adaptors engage the ball joint and urge the ball joint out of engagement with the frame.

18. The method recited in claim 17, further comprising the step of rotating the actuating screw in a second rotational direction causing the first member and second member to undergo a second pivoting action relative to the link to move the first adaptor away from the second adaptor.

19. A press for removing a ball joint from a vehicle, the press comprising:

a first frame including a first member, a nut having an internally threaded aperture extending therethrough, and a first adaptor, the first member having a first press portion and a first actuating portion, the first adaptor being coupled to the first press portion and the nut being coupled to the first actuating portion;

a second frame having a second member and a second adaptor, the second member having a second press portion and a second actuating portion, the second adaptor coupled to the second press portion;

a link pivotally coupled to the first member between the first press portion and the first actuating portion and to the second the second member between the second press portion and the second actuating portion; and an actuating screw being rotatably coupled to the first actuating portion of the first member and the second actuating portion of the second member, the actuating screw including external threads formed thereon which are engageable with the internally threaded aperture of the nut;

rotation of the actuating screw in a first rotational direction causing the first member and second member to undergo a first pivoting action relative to the link to move the first adaptor toward the second adaptor;

rotation of the actuating screw in a second rotational direction opposite the first rotational direction causing the first member and second member to undergo a second pivoting action relative to the link opposite to the first pivot action to move the first adaptor away from the second adaptor;

the first member being configured to translate along the actuating screw in response to rotation of the actuating screw relative to the first member.

20. The press recited in claim 19, wherein the nut is pivotally coupled to the first member of the first frame.

21. A press for removing a ball joint from a vehicle, the press comprising:

a first frame including a first member and a first adaptor, the first member having a first press portion and a first actuating portion, the first adaptor coupled to the first press portion;

a second frame having a second member, a second adaptor, and a rocking washer which is pivotally coupled to the second member and includes a bore, the second member having a second press portion and a second actuating portion, the second adaptor coupled to the second press portion;

a link pivotally coupled to the first member between the first press portion and the first actuating portion and to the second the second member between the second press portion and the second actuating portion; and an actuating screw being rotatably coupled to the first actuating portion of the first member and the second actuating portion of the second member, and end of the actuating screw being captured within the bore;

rotation of the actuating screw in a first rotational direction causing the first member and second member to undergo a first pivoting action relative to the link to move the first adaptor toward the second adaptor;

rotation of the actuating screw in a second rotational direction opposite the first rotational direction causing the first member and second member to undergo a second pivoting action relative to the link opposite to the first pivot action to move the first adaptor away from the second adaptor.

22. The press recited in claim 21, wherein the bore extends only partially through the rocking washer and defines a recessed face.

23. The press recited in claim 22, further comprising a rolling ball coupled to the actuating screw, the rolling ball contacting the recessed face when the end of the actuating screw is captured within the bore.

* * * * *

UNITED STATES PATENT AND TRADEMARK OFFICE
CERTIFICATE OF CORRECTION

Page 1 of 1

PATENT NO. : 11,161,228 B2
APPLICATION NO. : 16/433979
DATED : November 2, 2021
INVENTOR(S) : Chad Schley et al.

It is certified that error appears in the above-identified patent and that said Letters Patent is hereby corrected as shown below:

In the Claims

Claim 1, Column 8, Line 10, delete the first instance of "the second"

Claim 10, Column 8, Line 67, delete "frame"

Signed and Sealed this
Twenty-fifth Day of January, 2022

Drew Hirshfeld
*Performing the Functions and Duties of the
Under Secretary of Commerce for Intellectual Property and
Director of the United States Patent and Trademark Office*